(12) United States Patent
Chen

(10) Patent No.: US 9,243,746 B2
(45) Date of Patent: Jan. 26, 2016

(54) HOOK FOR HANGING AN OBJECT

(71) Applicant: Ching-I Chen, Taipei (TW)

(72) Inventor: Ching-I Chen, Taipei (TW)

(73) Assignee: Ching-I Chen, Taipei (TW)

( * ) Notice: Subject to any disclaimer, the term of this patent is extended or adjusted under 35 U.S.C. 154(b) by 0 days.

(21) Appl. No.: 14/307,621

(22) Filed: Jun. 18, 2014

(65) Prior Publication Data

US 2015/0308614 A1 Oct. 29, 2015

(30) Foreign Application Priority Data

Apr. 29, 2014 (TW) .............................. 103207479 U

(51) Int. Cl.
A47H 1/16 (2006.01)
F16M 13/02 (2006.01)
A47F 5/08 (2006.01)
F16B 2/22 (2006.01)

(52) U.S. Cl.
CPC .................. F16M 13/02 (2013.01); A47F 5/08 (2013.01); F16B 2/22 (2013.01)

(58) Field of Classification Search
CPC .............. F16M 13/02; F16B 2/22; A47F 5/08
USPC .................. 248/302, 303, 304, 110, 111, 113, 248/176.1, 686; 211/66, 70.2, 70.6, 70.7; 15/268
See application file for complete search history.

(56) References Cited

U.S. PATENT DOCUMENTS

| 2,892,269 | A | * | 6/1959 | Pospiszel | 294/142 |
| 3,016,221 | A | * | 1/1962 | Underwood | 248/102 |
| 3,289,985 | A | * | 12/1966 | Sheiman | 248/95 |
| 3,633,801 | A | * | 1/1972 | Bonasso | 294/142 |
| 3,804,310 | A | * | 4/1974 | Wheeler | 294/142 |
| 4,279,396 | A | | 7/1981 | Bendock | |
| 5,558,307 | A | | 9/1996 | Klein et al. | |
| 6,986,538 | B1 | * | 1/2006 | Ecker | 294/158 |
| 7,322,551 | B2 | * | 1/2008 | Simonsen | 248/231.81 |

FOREIGN PATENT DOCUMENTS

| FR | 2789867 A1 | 8/2000 |
| GB | 993078 A | 5/1965 |
| WO | 9106782 A1 | 5/1991 |

OTHER PUBLICATIONS

European Search Report issued on Oct. 5, 2015 from EP Patent Office in the corresponding EP Patent Application No. EP 15 16 5479.

* cited by examiner

Primary Examiner — Gwendolyn Baxter
(74) Attorney, Agent, or Firm — The PL Law Group, PLLC

(57) ABSTRACT

A hook for hanging an object using cantilever force is disclosed, and the hook includes a main body and a hook body. The hook body extends from the main body and includes a hook portion and a free end portion. The hook portion has an inner curved surface facing and close to the main body, and the free end portion is connected to the hook portion and has a blocking segment. A largest distance between the inner curved surface and the main body is configured to accommodate an object to be hung on the hook body, and the hook body is horizontally configured with respect to the ground when the main body is attached to a fixture.

19 Claims, 6 Drawing Sheets

HOOK FOR HANGING AN OBJECT

CROSS-REFERENCE TO RELATED APPLICATION AND CLAIM OF PRIORITY

This application claims the benefit of Taiwan Patent Application No. 103207479, filed on Apr. 29, 2014, at the Taiwan Intellectual Property Office, the disclosures of which are incorporated herein in their entirety by reference.

FIELD OF THE INVENTION

The present invention relates to a hook, and in particular, relates to a hook which uses cantilever force to hang an object.

BACKGROUND OF THE INVENTION

To satisfy the requirements for hanging objects, hooks usually act as accessories for hanging objects. A hook is typically designed to have a curved shape, wherein the tip of a hook body of the hook is oriented upward and opposite to the ground, so that an object may be hung on the curved portion of the hook and is subject to gravity without dropping from the curved portion thereof.

Please refer to FIGS. 1 and 2, which are schematic diagrams respectively showing a conventional hook and an object hung on this conventional hook. The conventional hook 100 includes a main body 110 that attaches to a predetermined position (e.g. a wall surface) and a hook body 120 connected to the main body 110. While hanging an object 200, the portion where the hook body 120 is directly subjected to the weight of the object 200 is a first horizontal part A', whereas a second horizontal part B' is not subject to the weight thereof because the second horizontal part B' protrudes over the object 200 without being physically connected to the object 200. Although such hook is useful, as shown in FIG. 2, when the object 200 (e.g. a rod piece having an end part having a hole) is to be hung on the hook 100, it is necessary to apply force against gravity to enable the hole of the rod piece to pass through the end portion of the second horizontal part B' and thus enable the rod piece to be successfully hung on the hook. It is relatively laborious and inconvenient when hanging a heavier rod piece having a hole thereon.

Furthermore, if it is desired to enable the rod piece to be hung on and without engaging with the hook 100 due to gravity, a length of the first horizontal part A' of the hook 100 must be larger than or equal to a geometrical length of a transverse cross-section of the rod piece. Nevertheless, the hook body would protrude outward such that it would cause a safety issue, and result in inconvenience. Therefore, a proper modification is to reduce the length of the first horizontal part A' of the hook 100 to be less than the geometrical length of the transverse cross-section of the rod piece. However, such a conventional hook 100 would cause the rod piece to engage at the curved position between the first horizontal part A' and the second horizontal part B', and the requirement would still not be satisfied.

It is therefore the Applicant's attempt to deal with the above situation encountered in the prior art.

SUMMARY OF THE INVENTION

The end portion of the hook body of the conventional hook is similar to a "Rommel's asparagus ('Rommelspargel' in German)" and results in injuries to people. In addition, the conventional hook has the drawback of inconveniently hanging an object. Therefore, based on these problems in the prior art, the purpose of this invention is to provide a hook for hanging a rod piece, which transversely slides into and is hung on the hook. The problems of safety and inconvenience will be overcome in the present invention.

According to a purpose of the present invention, a hook is disclosed and includes: a main body; and a hook body extending from the main body and including: a hook portion having an inner curved surface facing and close to the main body; and a free end portion connected to the hook portion and having a blocking segment. A distance between the inner curved surface and the main body is configured to accommodate an object hung on the hook body, and the hook body is horizontally configured with respect to the ground when the main body is attached to a fixture.

Preferably, the object is a rod piece having an end part having a hole.

Preferably, the blocking segment is a protruding object integratedly formed with the free end portion.

Preferably, the protruding object is in the shape of a cube, a cylinder or a pyramid.

Preferably, the blocking segment is a brush configured on the free end portion.

Preferably, the brush is made of plastic, rubber or animal fur.

Preferably, the animal fur is mane, crest or wool.

Preferably, the blocking segment is an end cap engaging with the free end portion.

Preferably, the end cap is made of a material, such as plastic, rubber, metal, alloy or a combination thereof.

Preferably, the blocking segment is a rubber cone configured on the free end portion.

Preferably, the fixture is a wall having a surface substantially vertical to the ground, and the hook body is attached to the surface.

The present invention further discloses a hook, including: a main body; and a hook body including: a hook portion extending from the main body and close to the main body, wherein there is a space between the hook body and the main body to enable an object to pass through the hook body and to be hung on the hook body; and a slip stopper disposed on the hook portion to increase a frictional force between the object and the hook portion after the object is hung on the hook portion. The hook body is horizontally configured with respect to the ground when the hook is attached to a fixture.

Preferably, the slip stopper is coated with an abrasive.

Preferably, the slip stopper has an uneven surface.

The present invention further discloses a hanging device, including: a main body including a first surface and a second surface opposite to the first surface; and a hook body including a first horizontal part connected to the second surface, and a second horizontal part connected to the first horizontal part and configured to hang an object. The hook body is horizontally configured with respect to the ground when the first surface is attached to a fixture.

Preferably, the hook body further includes a slip stopper to prevent the object from slipping off of the hook body after the object is hung on the hook body.

Preferably, the first surface has a viscous material configured thereon to be attached to the fixture.

Preferably, the hanging device further includes a fastener to be punctured through the main body into the fixture.

Preferably, the fastener is a nail or a staple.

Preferably, the hanging device further includes a protruding object configured on an end of the second horizontal part, the second horizontal part has a first longitudinal length, the protruding object has a second longitudinal length, the object is a rod piece having a transverse cross-section with a geometrical length, and the first longitudinal length is equal to or slightly larger than the sum of the second longitudinal length and the geometrical length.

BRIEF DESCRIPTION OF THE DRAWINGS

The above objectives and advantages of the present invention will become more readily apparent to those ordinarily skilled in the art after reviewing the following detailed descriptions and accompanying drawings.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; they are not intended to be exhaustive or to be limited to the precise form disclosed.

To more easily describe the technical contents of the present invention, the same components in the various embodiments are denoted with the same numerals. In addition, the drawings are intended to illustrate and support the specification, and are not intended to show the actual proportional scale or the precise configuration.

Figure 1:
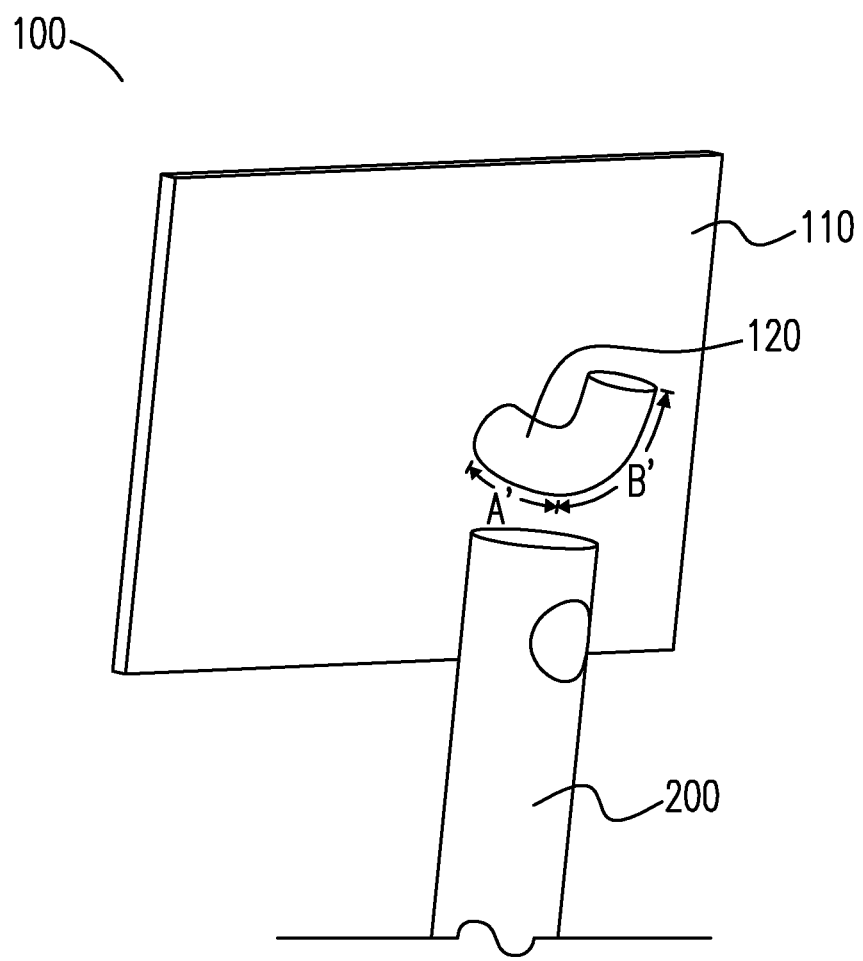
FIG. 1 is a schematic diagram showing a conventional hook.
Figure 2:
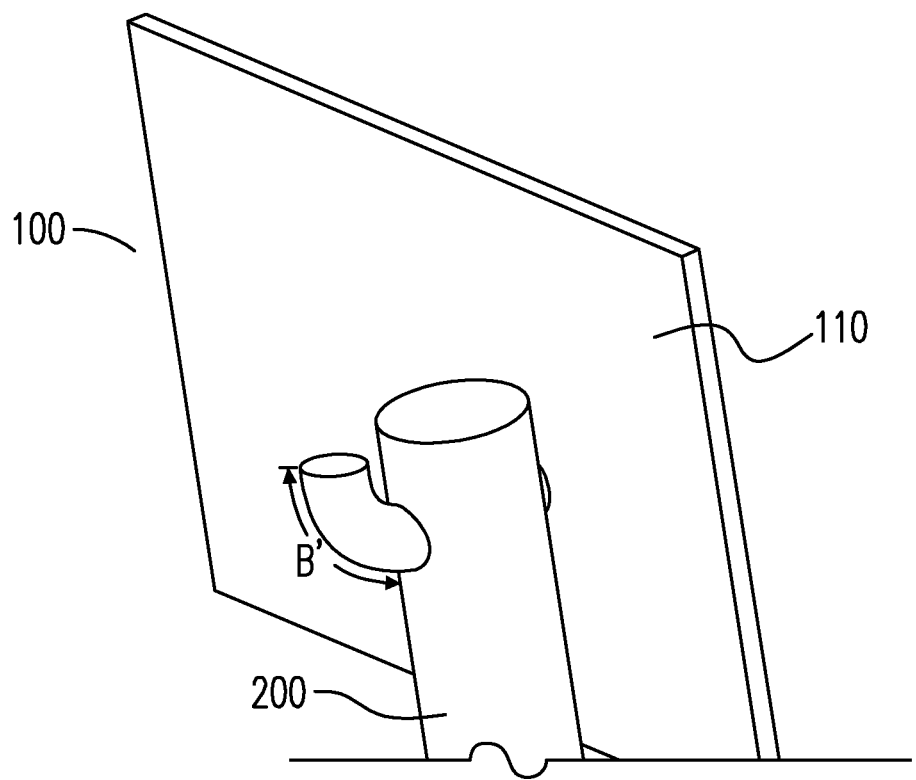
FIG. 2 is a schematic diagram showing an object hung on the conventional hook.
Figure 3:
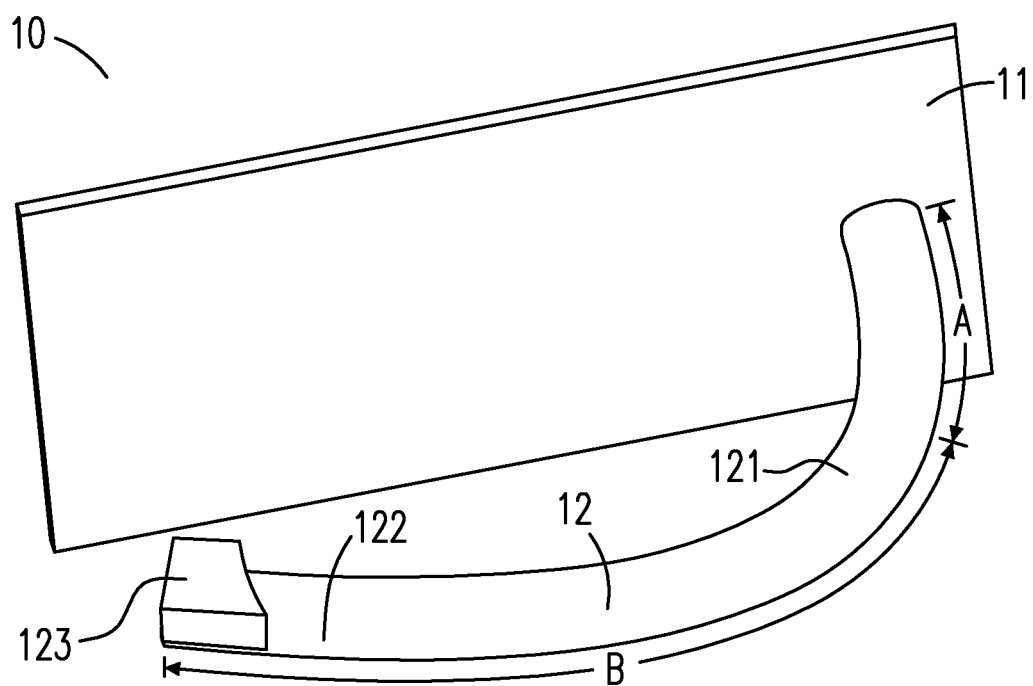
FIG. 3 is a schematic diagram showing a hook in a first embodiment of the present invention.
Figure 4:
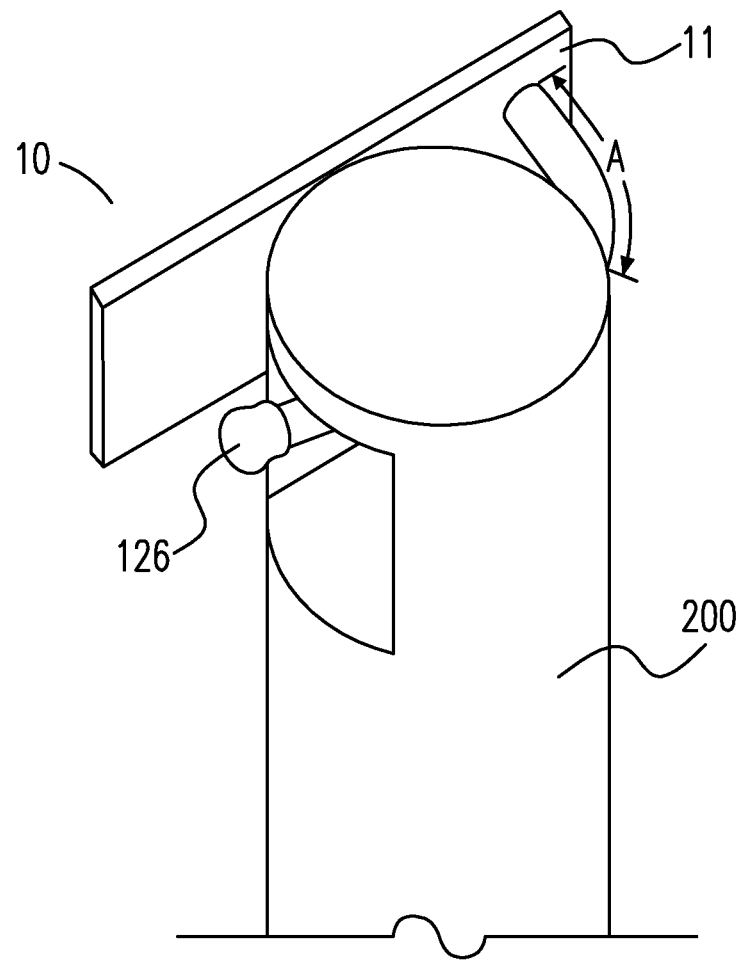
FIG. 4 is a schematic diagram showing an object hung on the hook in the first embodiment of the present invention.

Please refer to FIG. 3, which is a schematic diagram showing a hook in a first embodiment of the present invention, and FIG. 4, which is a schematic diagram showing an object hung on the hook in the first embodiment of the present invention. In the first embodiment of the present invention, the hook 10 includes a main body 11 and a hook body 12. There are two surfaces on the main body 11, wherein one surface can be attached to a fixture (e.g. a wall surface, not shown in FIG. 3 or FIG. 4) using any (but not limited to) viscous material. The viscous material is not essential, and the surface also can be attached to the fixture using a fastener (e.g. a nail or a staple, not shown in FIG. 3) through the main body 11 into the fixture or using another method. The hook body 12 extends from the other surface of the main body 11. The hook body 12 includes a hook portion 121 and a free end portion 122 connected to the hook portion 121. The hook portion 121 has an inner curved surface facing and close to the main body 11, and the largest distance between the inner curved surface and the main body 11 is a distance which is configured to accommodate an object to be hung on the hook portion 121. When the main body 11 is attached to the fixture, the hook body 12 is horizontally configured with respect to the ground.

As for the hook 10 in the first embodiment, the free end portion 122 includes a blocking segment or a slip stopper, which is a protruding object 123 integratedly formed with the free end portion 122. The hook portion 121 can be further divided as a first horizontal part A and a second horizontal part B. While hanging an object 200 (e.g. a rod piece with a hole thereon, shown in FIG. 4), the second horizontal part B is directly subjected to the weight of the object. A minimum length of the second horizontal part B is equal to or slightly larger than sum of the geometrical length of a transverse cross-section of the rod piece and a longitudinal length of the protruding object 123, and the minimum length makes it difficult for the rod piece to slip off of the hook portion 121 and the protruding object 123. The first horizontal part A is connected to the main body 11 without being directly subject to the weight of the object. When the object is hung on the hook of the present invention, a minimum length of the hook portion 121 which protrudes from the rod piece is a length that the protruding object 123 substantially runs along a longitudinal direction of the main body 11 (or a direction extended from the hook portion 121 to the free end portion 122). The shape of the protruding object 123 is (but not limited to) a cube (e.g. the protruding object 123 in FIG. 3), a cylinder (e.g. the protruding object 126 in FIG. 4), a pyramid, any three dimensional structure, or a slip stopper configured on the hook portion 121, so as to enhance the frictional force between the object and the hook portion 121 after the object is hung on the hook portion 121. The protruding object 123 or 126 is designed to prevent the rod piece from slipping off of the hook 10.

Figure 5:
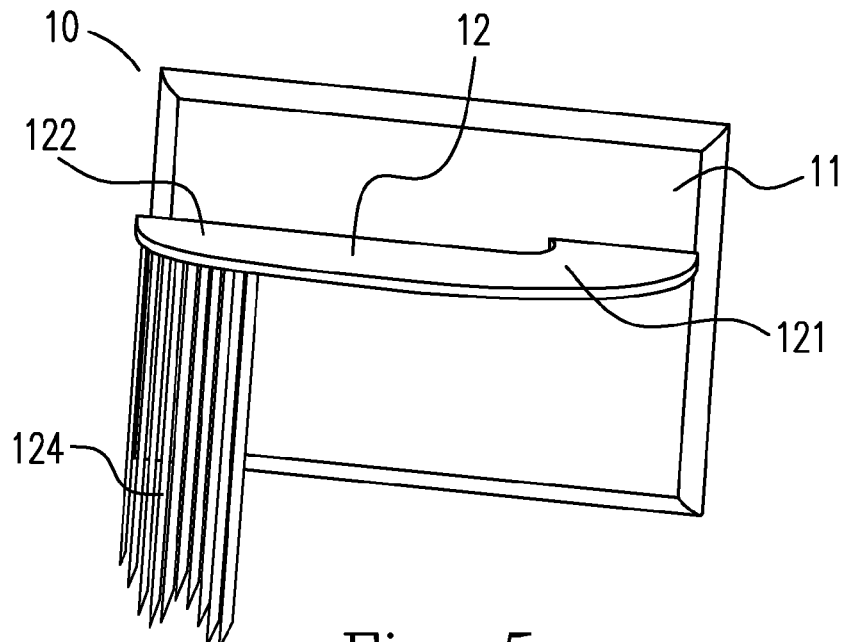
FIG. 5 is a schematic diagram showing a hook in a second embodiment of the present invention.

In addition, please refer to FIG. 5, which is a schematic diagram showing a hook in a second embodiment of the present invention. The structure of the hook 10 in this embodiment is similar to that of the hook 10 in the first embodiment, and the difference lies in that the blocking segment of the hook 10 in the second embodiment is a brush 124 configured on the free end portion 122. The material of the brush 124 may be but is not limited to plastic, rubber or animal fur (e.g. mane, crest and wool). As for the brush 124, the length of the object 124 far from the free end portion is slightly smaller than a diametric length of the hole of the rod piece, and the length of the object 124 close to the free end portion is slightly larger than that of the hole of the rod piece, so that the rod piece can be conveniently hung, and the brush 124 will prevent the rod piece from slipping off of the hook 10 (not shown in FIG. 5).

Figure 6:
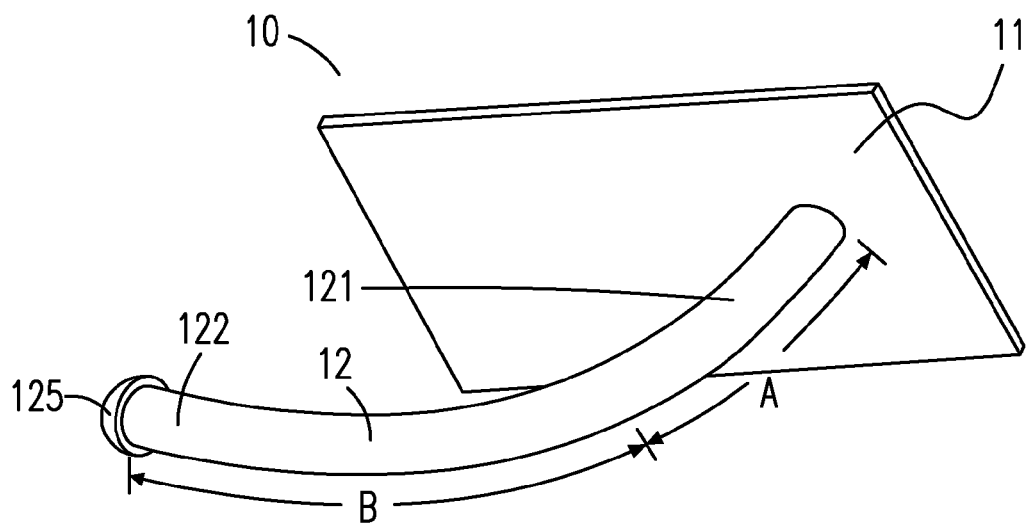
FIG. 6 is a schematic diagram showing a hook in a third embodiment of the present invention.

In addition, please refer to FIG. 6, which is a schematic diagram showing a hook in a third embodiment of the present invention. The hook 10 in this embodiment has a similar structure with that in the first embodiment, and the difference between both hooks 10 lies in that the blocking segment of the hook 10 in the third embodiment is an end cap 125 on the free end portion 122. The material of the end cap 125 may be but is not limited to plastic, rubber, metal, alloy or a combination thereof. The end cap 125 will prevent the rod piece from slipping off of the hook 10.

Figure 7:
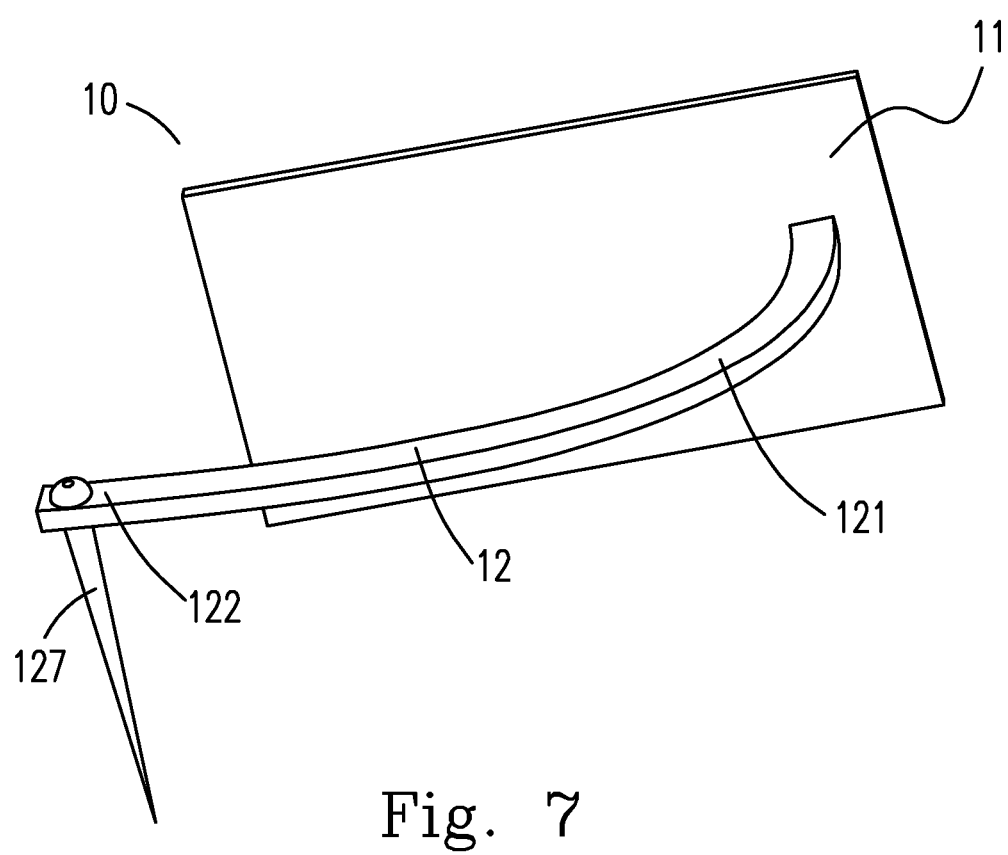
FIG. 7 is a schematic diagram showing a hook in a fourth embodiment of the present invention.

In addition, please refer to FIG. 7, which is a schematic diagram showing a hook in a fourth embodiment of the present invention. The hook 10 in this embodiment has a similar structure with that in the first embodiment, and the difference between both hooks 10 lies in that the blocking segment of the hook 10 in the fourth embodiment is a rubber cone 127 configured on the free end portion 122. The rubber cone 127 is elastic and may be bent when put under stress. When the rod piece (not shown in FIG. 7) is to be hung on the hook, the rubber cone 127 is bent by the stress from the rod piece and then the rod piece passes over or around the rubber cone 127 and is hung on the hook 10. The rubber cone 127, preferably, is limited to have a length slightly larger than a diametric length of the hole of the rod piece, so as to prevent the rod piece from slipping off of the hook 10.

In conclusion, in the present invention, when a rod piece is to be hung on the hook 10, it is not necessary to laboriously move the rod piece forward to the first horizontal part A by configuring the hole of the rod piece over the second horizontal portion B, and what is only needed is to make a normal direction for the hole parallel with the second horizontal part B to conveniently hang the rod piece on the hook. Thus the hook body 12 can hang the rod piece using cantilever force and bear the weight of the rod piece. Furthermore, the length of the first horizontal part A of the hook is only the difference between a radius of the cross-section of the rod piece and a radius of the hole of the rod piece, and thus it enables the rod piece to be easily hung on the hook 10. The situation that the rod piece engages at the curved position between the first and the second horizontal parts A and B does not occur. Spatial requirements for the "protruded" hook fixed on the wall, and potential damage from a "Rommel's asparagus" type hook are significantly reduced.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A hook, comprising:
   a main body; and
   a hook body extending from the main body and including:
   a hook portion having an inner curved surface facing and close to the main body; and
   a free end portion connected to the hook portion and having a blocking segment,
   wherein a largest distance between the inner curved surface and the main body is configured to accommodate an object to be hung on the hook body, the object is a rod piece having an end part having a hole, and the hook body is horizontally configured with respect to the ground when the main body is attached to a fixture.

2. The hook according to claim 1, wherein the blocking segment is a protruding object integratedly formed with the free end portion.

3. The hook according to claim 2, wherein the protruding object has a shape being one selected from a group consisting of a cube, a cylinder and a pyramid.

4. The hook according to claim 1, wherein the blocking segment is a brush configured on the free end portion.

5. The hook according to claim 4, wherein the brush is made of a material selected from a group consisting of a plastic, a rubber and an animal fur.

6. The hook according to claim 5, wherein the animal fur is one selected from a group consisting of mane, crest and wool.

7. The hook according to claim 1, wherein the blocking segment is an end cap on the free end portion.

8. The hook according to claim 7, wherein the end cap is made of a material being one selected from a group consisting of a plastic, a rubber, a metal, an alloy and a combination thereof.

9. The hook according to claim 1, wherein the blocking segment is a rubber cone configured on the free end portion.

10. The hook according to claim 1, wherein the fixture is a wall having a surface substantially vertical to the ground, and the hook body is attached to the surface.

11. A hook, comprising:
    a main body; and
    a hook body including:
    a hook portion extending from the main body and close to the main body, wherein there is a space between the hook body and the main body to enable an object to pass through the hook body and to be hung on the hook body, wherein the object is a rod piece having an end part having a hole; and
    a slip stopper disposed on the hook portion to increase a frictional force between the object and the hook portion after the object is hung on the hook portion,
    wherein the hook body is horizontally configured with respect to the ground when the hook is attached to a fixture.

12. The hook according to claim 11, wherein the slip stopper is coated with an abrasive.

13. The hook according to claim 11, wherein the slip stopper has an uneven surface.

14. A hanging device, comprising:
    a main body including a first surface and a second surface opposite to the first surface; and
    a hook body comprising a first horizontal part connected to the second surface, and a second horizontal part connected to the first horizontal part and configured to hang an object,
    wherein the object is a rod piece having an end part having a hole, and the hook body is horizontally configured with respect to the ground when the first surface is attached to a fixture.

15. The hanging device according to claim 14, wherein the hook body further comprises a slip stopper to prevent the object from slipping off of the hook body after the object is hung on the hook body.

16. The hanging device according to claim 14, wherein the first surface has a viscous material configured thereon to attach to the fixture.

17. The hanging device according to claim 14 further comprising a fastener to puncture through the main body into the fixture.

18. The hanging device according to claim 17, wherein the fastener is one of a nail and a staple.

19. The hanging device according to claim 14 further comprising a protruding object configured on an end of the second horizontal part, the second horizontal part has a first longitudinal length, the protruding object has a second longitudinal length, the has a transverse cross-section with a geometrical length, and the first longitudinal length is equal to or slightly larger than the sum of the second longitudinal length and the geometrical length.

* * * * *